(No Model.)  3 Sheets—Sheet 1.

J. LUCIA.
LOG ROLLER FOR SAW MILLS.

No. 273,561.  Patented Mar. 6, 1883.

Witnesses:
Louis F. Gardner
E. D. York

Inventor:
Joel Lucia
per
F. A. Lehmann,
Atty.

(No Model.)  3 Sheets—Sheet 2.

J. LUCIA.
LOG ROLLER FOR SAW MILLS.

No. 273,561. Patented Mar. 6, 1883.

Witnesses:
Louis F. Gardner
E. D. York

Inventor:
Joel Lucia
per
F. A. Lehmann,
Atty (No Model.)   J. LUCIA.   3 Sheets—Sheet 3.
LOG ROLLER FOR SAW MILLS.
No. 273,561.   Patented Mar. 6, 1883.
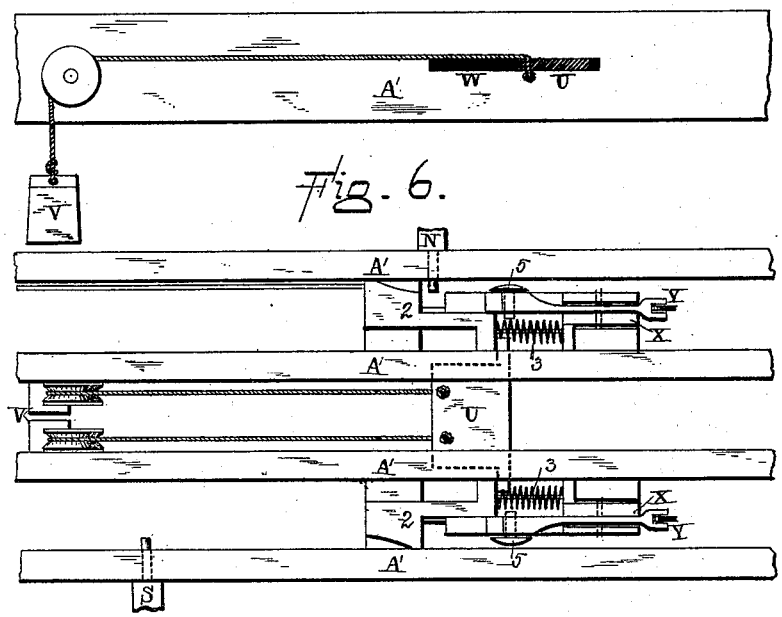
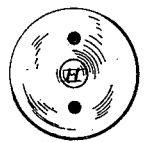
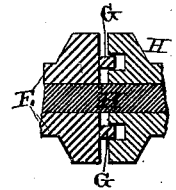
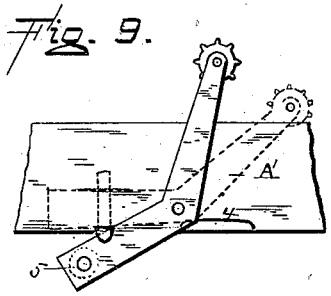
Witnesses.
Louis L. Gardner
E. D. York
Inventor.
Joel Lucia,
per
F. A. Lehmann,
atty

UNITED STATES PATENT OFFICE.

JOEL LUCIA, OF LITTLE SUAMICO, WISCONSIN.

LOG-ROLLER FOR SAW-MILLS.

SPECIFICATION forming part of Letters Patent No. 273,561, dated March 6, 1883.

Application filed October 2, 1882. (No model.)

*To all whom it may concern:*

Be it known that I, JOEL LUCIA, of Little Suamico, in the county of Oconto and State of Wisconsin, have invented certain new and useful Improvements in Log-Rollers for Saw-Mills; and I do hereby declare the following to be a full, clear, and exact description of the invention, such as will enable others skilled in the art to which it pertains to make and use it, reference being had to the accompanying drawings, which form part of this specification.

My invention relates to an improvement in log-rollers for saw-mills; and it consists, first, in the combination of cross-heads, cross-head connections, and suitable springs, which are interposed between them, whereby either cross-head can be moved back of the other, so that logs which are thicker at one end than the other can be moved up to the saw, so that the lumber cut from them will run true with the grain of the wood; second, in the combination of the cross-head and its attachment and suitable endwise-moving levers which are connected to the clutches, whereby, when the cross-head has reached the end of its movement, the clutch will be made to open and stop the cross-head; third, in the arrangement and combination of parts, which will be more fully described hereinafter.

Figure 1:
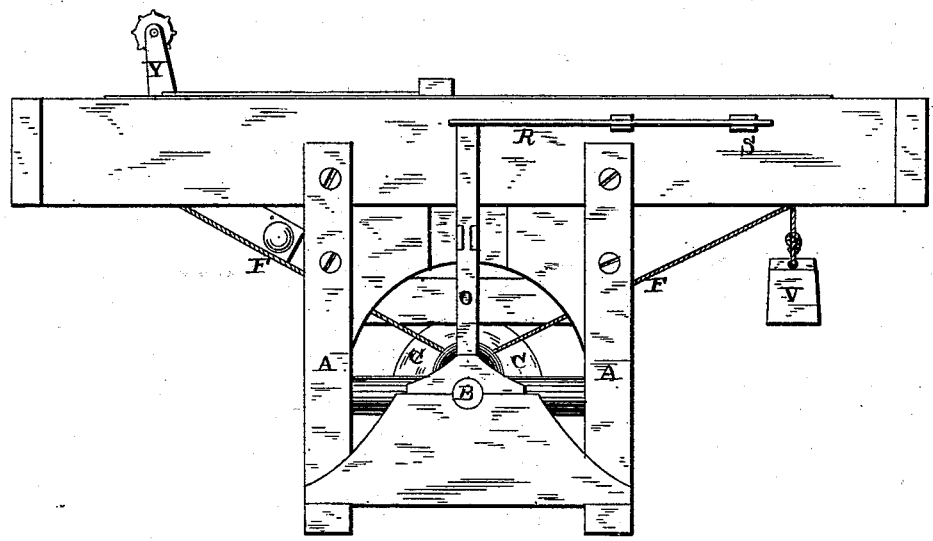
Figure 2:
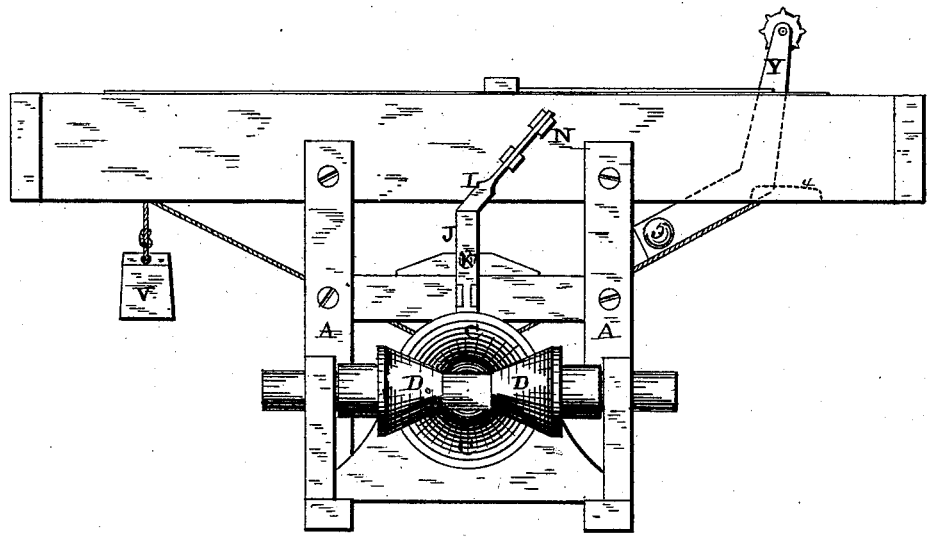
Figure 3:
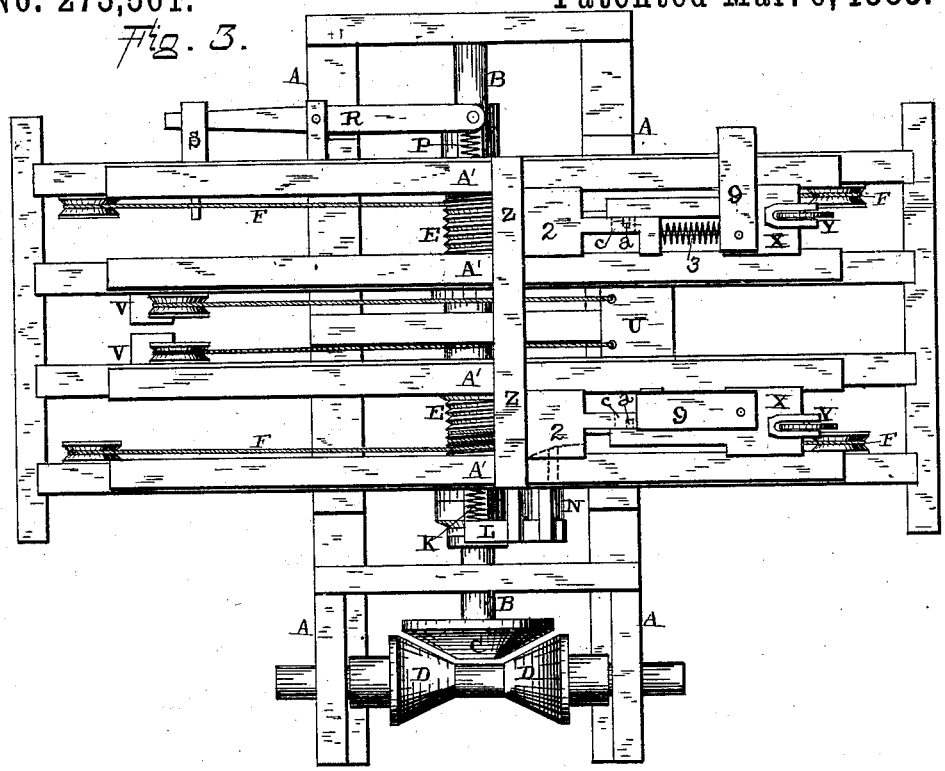
Figure 4:
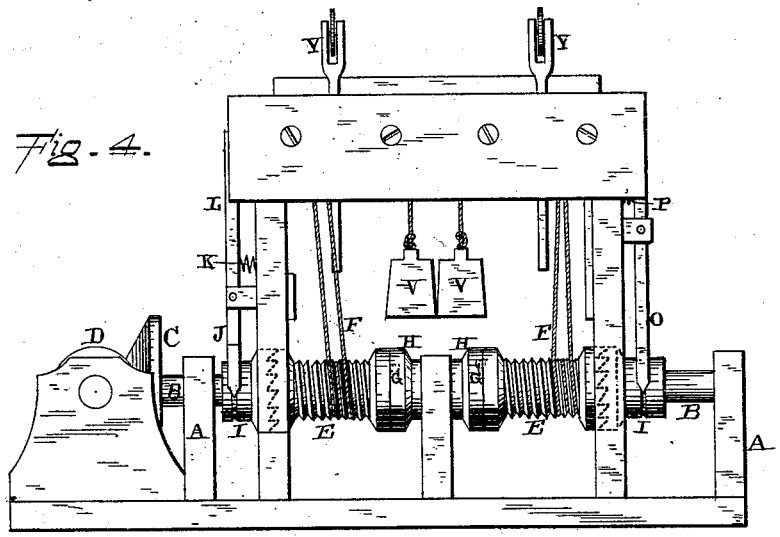

Figure 1 is a side elevation of my invention. Fig. 2 is a view taken from the opposite side. Fig. 3 is a plan view. Fig. 4 is an end view. Figs. 5, 6, 7, 8, 9 are detail views.

A represents a suitable frame, in which is mounted the driving-shaft B, which is provided with a cone friction-pulley, C, on one end. This cone is to be driven by the double-cone pulley D, so as to move the cross-head either forward or back, according to which end of the cone-pulley D the friction-pulley C is made to engage with. Upon this driving-shaft are placed the two spirally-grooved sheaves, E, around which the chains F, which move the cross-heads back and forth, are made to pass. These sheaves have suitable stops or projections, G, formed on their inner ends, so as to fit into suitable recesses made in the ends of the enlargement H, which is placed loosely on the driving-shaft B. By this means the two sheaves are connected together, so as to be made to move in the same direction and at the same time.

Upon the outer end of each sheave is formed a ratchet, so that it will engage with the clutch I, which is made to revolve with the driving-shaft by means of a spline, in the usual manner. These clutches are alternately brought into play, so that one moves the cross-head back while the other one moves it forward, when the motion of the shaft B is reversed. The projections G and corresponding recesses shown in Fig. 8 serve simply to connect the sheaves with the central part, H, and thus connect the two sheaves rigidly together.

Extending upward from the clutch which is nearest to the friction-pulley C is the shifting-lever J, which has the spiral spring K to bear against its inner side for the purpose of automatically moving the lever J whenever it is free to move. Connected to the upper end of this lever J is the pivoted lever L, which has its upper end connected with the slide-lever N, which has its inner end made to pass through the side of the frame A.

The inner end of the endwise-moving lever N projects through the frame far enough to have the cross-head attachment strike against it as the cross-head is moved forward, and as the attachment is beveled where it strikes against the end of the lever, the lever is forced outward, so as to operate the clutch and throw it out of contact with its sheave. This action stops the forward movement of the cross-head. The clutch which is farthest away from the driving-pulley C has connected to it a shifting-lever, O, which has the spiral spring P to bear against its inner side above its pivot. The upper end of this shifting-lever O has connected to it the pivoted lever R, which operates the second endwise-moving lever, S, which also has its end to project through the frame sufficiently far to be struck by the rear end of the cross-head attachment, and thus operate the second clutch, so as to stop the movement of the cross-head when it has reached a certain point upon the frame. Should the cross-head at any time get away from the operator, it will automatically stop at the proper place, no matter whether moving forward or back.

The chains which move the cross-head back and forth pass up over the guiding-pulleys and are fastened to the opposite ends of the cross-heads and their attachments. When one of the sheaves is made to revolve in one direction the cross-heads are forced forward, rolling or pushing the log before them, and when the other sheave is thrown into operation it draws the cross-head back, ready for another log. When the chain F, which draws the cross-heads forward, is in operation, the other chain is being moved idly around its sheave, and when the motion of the shaft B is reversed the other chain is brought into play to move the cross-heads back. This difference in the movements of the chains is effected by means of the spiral grooves in the two sheaves, which grooves are made to run in opposite directions, as shown in Fig. 4, so that they always cause the chains to move in opposite directions. After the cross-head has been forced forward, the sheave is thrown out of gear, as above described, the slide U, which has the weights V attached to it, forces the cross-head back the length of the slot W, in which the slide moves, as shown at Fig. 5. This slide has its end made to project through the center beams of the frame and bears against the cross-head attachment. When the sheave is thrown out of gear by the shifting of the clutch, the weights attached to the slide exert sufficient pressure upon the cross-head attachments to move the cross-heads back out of the way. This arrangement serves to prevent accidents to the machine.

The cross-heads X, carrying the pivoted levers Y, having the sharp-pronged wheels journaled in their upper ends, move back and forth in the usual manner, and in their backward movement pass under the stationary bar Z, which extends across the frame, so as to force the pivoted levers downward in the usual manner. When the cross-heads are forced forward these sharp-pronged wheels catch against the rear side of the log and roll or push it forward toward the saw. Fastened to each cross-head are the spring hooks or catches, by means of which the levers can be held in this depressed position when so desired. The cross-head X is made separate from the cross-head attachment 2, and a suitable spring, 3, is placed between the two parts, so as to keep the two parts separated the full length of the slot, which is made through either the cross-head itself or the attachment. A pin or projection, a, extends out from one part, so as to extend into this slot c, and thus holds the two parts movably together, as shown in dotted lines in Fig 3. By making these two parts separate and allowing the cross-head a movement independent of its attachments, logs which are thicker at one end than the other will cause the two cross-heads to adjust themselves to this inequality, and thus force the log forward, so that the grain of the wood will be in a line with the saw.

When a log which is thicker at one end than the other is placed upon the frame and the two cross-heads are set in motion for the purpose of forcing the log forward, the cross-head which comes against the thickest part of the log will give backward until the other cross-head has adjusted itself to the thinner end of the log, and then the two cross-heads together will force the log forward. This adjustment of the log takes place automatically, because the heavier end of the log, being harder to move, compresses its spring 3 more than the lighter end when the power is applied to move the log forward, and hence the lighter end will move slightly forward before the heavier one. Where logs which are thicker at one end than the other are forced forward to the saw, so that one end is in advance of the other, the lumber is sawed more or less across the grain of the wood, to its great injury.

Over the top of the opening, between the cross-head and its attachment, and in which the spring is placed, is secured a suitable covering device, o, which will prevent dirt and pieces of wood from getting in between the spring, and thus clogging its action.

Secured to the inner side of one of the beams A', near the front end, are suitable guides or springs, 4, upon which the roller 5 on the lower end of the pivoted lever can be made to catch when the cross-head is moved forward, so that the upper ends of the pivoted levers will be thrown forward and depressed. By this construction the levers can be held in a depressed condition, and thus be held out of contact with the log.

Having thus described my invention, I claim—

1. The combination, in a log-roller for saw-mills, of the cross-head provided with a log-roller with the cross-head attachment, which is loosely connected to the cross-head, and a mechanism for moving the head and attachment back and forth, substantially as shown.

2. The combination, in a log-roller for saw-mills, of the cross-heads carrying the log-rollers, the cross-head attachments loosely connected to the cross-heads, springs interposed between the heads and the attachments, and suitable means for drawing the heads and attachments forward and back, substantially as set forth.

3. In a log-roller for saw-mills, the combination of the cross-head, the endwise-moving lever, which projects through the frame, and suitable connecting rods or levers, the clutch and the sheave on the driving-shaft, substantially as set forth.

4. In a log-roller for saw-mills, the combination, with the cross-heads and their log-rollers, of a slide placed between the cross-heads, so as to connect them together, and a suitable weight, which is attached to the slide for the purpose of drawing the cross-heads back after the clutch has been thrown out of gear, substantially as specified.

5. The combination of the driving-shaft, the two sheaves placed thereon, having their grooves running in opposite directions, and connected together, the clutches at their outer ends, and an automatic mechanism for alternately moving the clutches for the purpose of reversing the movement of the cross-heads, substantially as shown.

In testimony whereof I affix my signature in presence of two witnesses.

JOEL LUCIA.

Witnesses:
C. EDWARD SHULTZ,
W. A. LEAVITT.